United States Patent
Buchholz et al.

(10) Patent No.: US 8,339,103 B2
(45) Date of Patent: Dec. 25, 2012

(54) LIFE SAFETY DEVICE WITH EXTENDED SHELF LIFE

(75) Inventors: Matthew J. Buchholz, Canon City, CO (US); Travis Silver, Colorado Springs, CO (US)

(73) Assignee: Walter Kidde Portable Equipment Inc., Mebane, NC (US)

( * ) Notice: Subject to any disclaimer, the term of this patent is extended or adjusted under 35 U.S.C. 154(b) by 940 days.

(21) Appl. No.: 12/288,164

(22) Filed: Oct. 16, 2008

(65) Prior Publication Data

US 2010/0097035 A1    Apr. 22, 2010

(51) Int. Cl.
*H02J 7/04* (2006.01)
(52) U.S. Cl. ....................................... 320/134
(58) Field of Classification Search .................... 320/134
See application file for complete search history.

(56) References Cited

U.S. PATENT DOCUMENTS

| | | | |
|---|---|---|---|
| 5,610,495 A | 3/1997 | Yee et al. | |
| 5,898,293 A | 4/1999 | Tamai et al. | |
| 6,144,186 A | 11/2000 | Thandiwe et al. | |
| 7,038,333 B2 | 5/2006 | Bourilkov et al. | |
| 7,123,158 B2 | 10/2006 | Deluca et al. | |
| 2005/0182987 A1* | 8/2005 | Sakurai | 713/340 |
| 2006/0082464 A1 | 4/2006 | Andres et al. | |
| 2008/0036426 A1 | 2/2008 | Kung et al. | |

OTHER PUBLICATIONS

The International Search Report and Written Opinion of counterpart foreign application No. PCT/US2009/005645 filed Oct. 16, 2009.
Battery Protection for Single-Cell Pack (product specification) S-8261 Series, Rev. 1.1, Seiko Instruments Inc. (26 pages).
VFM Step-Up DC/DC Converter Controller (product specification) RN5RY 202, No. EA-042-0204, RICOH (9 pages).
CET Dual N-Channel Enhancement Mode Field Effect Transistor (product specification) CEG8205, Dec. 2002, http://www.setsemi.com (3 pages).
Adjustable Precision Shunt Regulators (product specification) TL431, TL431A, TL431B, TL432, TL432A and TL432B; SLVS543J—Aug. 2004, Revised Dec. 2005; Texas Instruments, Dallas, Texas; Copyright 2005, Texas Instruments Incorporated (67 pages).
Programmable Shunt Regulator (product specification) TL431/TL431A, Rev. 1.0.3, Copyright 2003 Fairchild Semiconductor Corporation (10 pages).
CET N-Channel Enhancement Mode Field Effect Transistor (product specification) CES3212, Nov. 2005, http://www.setsemi.com (3 pages).

* cited by examiner

*Primary Examiner* — Reena Aurora
(74) *Attorney, Agent, or Firm* — MH2 Technology Law Group, LLP

(57) ABSTRACT

A life safety device includes a battery assembly with a rechargeable battery. Extended shelf life is achieved by annually initiating an over-discharge protection mode in which a battery protection circuit prevents current flow from the battery. The life safety device remains in the over-discharge protection mode until the device is connected to a charging power source at the time of installation. The battery assembly then exits the protection mode and enters its normal mode of operation.

20 Claims, 2 Drawing Sheets

LIFE SAFETY DEVICE WITH EXTENDED SHELF LIFE

BACKGROUND

The present invention relates to life safety devices having a battery assembly with a rechargeable battery.

Flush mount life safety devices are used in residential and commercial buildings to provide warning to occupants of hazards such as fire or a buildup of unsafe gases such as carbon monoxide. The life safety devices are typically mounted on a wall or a ceiling of a building. Typically, flush mount life safety devices are powered by a battery assembly that includes a rechargeable battery. The life safety device is connected to a source of AC power, which provides electrical current for charging the rechargeable battery.

The rechargeable battery is a part of a battery assembly that is mounted in the life safety device at the factory. Once the battery assembly is connected to the circuitry of the life safety device, power can be drawn from the battery prior to the device being placed into service. Under those conditions, the life safety device is not connected to a source of AC power, and therefore the battery is not being recharged.

The battery assembly typically includes a rechargeable battery, a battery charging circuit, a booster circuit to increase the battery voltage to a voltage level required to operate the life safety device circuitry, and a battery protection circuit. The battery protection circuit provides over-current protection, which disconnects the battery if the current draw is too high, and over-discharge protection to prevent the battery cell voltage from decreasing to a level which will cause internal damage to the cell.

When shipping a life safety device with a rechargeable battery, it has been a conventional method to place the battery protection circuit in an over-current protection mode. This may be achieved, for example, by shorting the battery voltage terminal of the battery assembly to the ground terminal prior to shipping the product.

To ensure the long service life for the life safety device (e.g., a ten year service life), the shelf life of the device must be limited. The shelf life is determined by the current consumption required between the time of installation of the battery assembly in the device and the installation of the device with a connection to AC power. If the product is kept "on the shelf" (i.e., either unsold or sold but not yet installed) beyond the shelf life, the battery cell voltage may slowly fall to a level that causes internal damage to the cell(s) of the battery. To avoid cell damage, any device that has exceeded its shelf life has to be returned to the factory, the battery must be replaced with a newly recharged battery, and the product must be repackaged and reshipped.

Although the over-current protection reduces the amount of current drawn from the battery prior to installation, the limited shelf of the devices life has remained an issue. Removal of products from stores because of expired shelf life of the battery assembly is inconvenient and expensive.

SUMMARY

Extended shelf life of a battery of a life safety device is achieved by making use of an over-discharge protection mode of a battery protection circuit associated with the rechargeable battery. At the time of installation of the battery assembly and shipment of the life safety device, the over-discharge protection (or power down) mode can be initiated to prevent current flow from the battery. Once initiated, the over-discharge protection mode will continue until the life safety device is connected to a charging power source.

The over-discharge protection mode offers much lower current consumption requirements than the over-current protection mode. As a result, shelf life of the device is extended.

DETAILED DESCRIPTION

Figure 1:
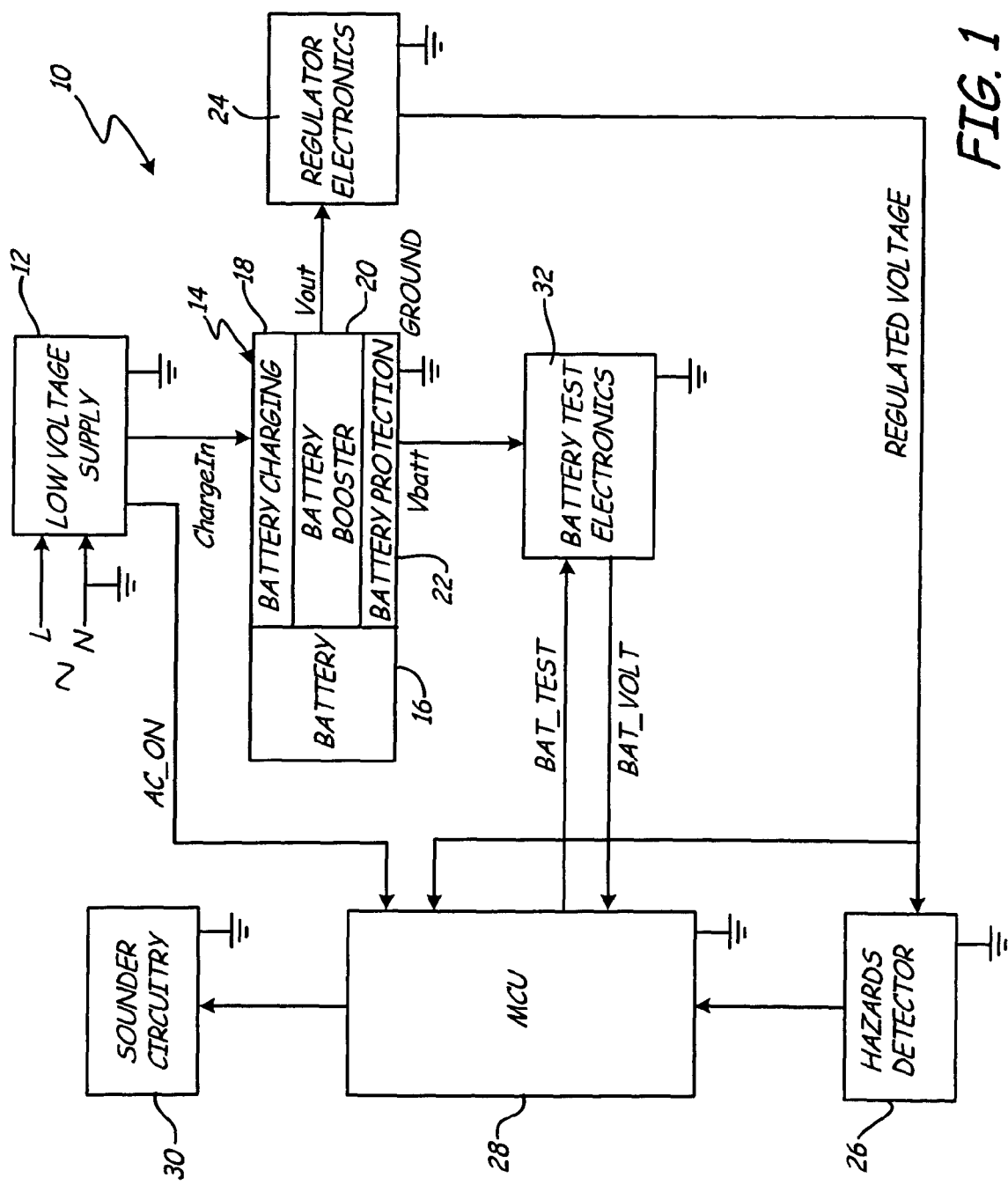
FIG. 1 is a block diagram of a life safety device.

FIG. 1 shows a block diagram of flush mount life safety device 10, which may be, for example, a smoke alarm, a carbon monoxide (CO) alarm, a combination smoke and CO alarm, or a similar device for providing warning to occupants of a residence or other building of a potentially life threatening condition. Flush mount life safety device 10 is typically mounted on a wall or ceiling, and is connected to a source of alternating current (AC) power.

As shown in FIG. 1, life safety device includes low voltage supply 12, battery assembly 14 (which includes rechargeable battery 16, battery charging circuit 18, booster circuit 20, and battery protection circuit 22), regulator electronics 24, hazards detector 26, microcontroller unit (MCU) 28, sounder circuitry 30, and battery test electronics 32.

Low voltage supply 12 is connected to an AC mains input, as represented by line input L and neutral input N. Low voltage supply 12 converts AC input power to DC charging power, which is provided to the Charge In input of battery assembly 14 and regulator electronics 24. Low voltage supply 12 also provides an AC_ON monitoring signal to MCU 28, which indicates that low voltage supply 12 is receiving AC power from the AC mains input.

Battery 16 of battery assembly 14 is a long life rechargeable battery, such as a lithium ion rechargeable battery. Battery charging circuit 18 maintains charge on battery 16 using the charging power from low voltage supply 12. Booster circuit 20 increases battery voltage Vbatt, which may range from about 2.2 to 4.2 volts, to output voltage Vout, which is used by regulator electronics 24 to provide regulated voltage to hazards detector 26 and MCU 28. Vout may be, for example, a constant voltage of about 8.7 volts.

Battery protection circuit 22 provides protection to battery 16 against over-current and over-discharge conditions. Battery protection circuit 22 enters protection modes, in which battery 16 may be disconnected from other circuit components when the battery voltage Vbatt is too low (an over-discharge condition) or when the current being drawn from battery 16 exceeds a maximum current level (over-current protection).

Hazards detector 26 may be, for example, a photoelectric or ionization type smoke detector, a carbon monoxide detector, or a combination smoke and carbon monoxide detector. The output of hazards detector 26 is provided to MCU 28.

MCU 28 coordinates and controls the operation of life safety device 10. Based upon inputs received from hazards detector 26, MCU 28 determines whether a condition exists that requires sounding an alarm to warn occupants of a potentially dangerous condition. If an alarm is required, MCU 28 provides control signals to sounder circuitry 30 to generate the appropriate alarm. In some cases, the alarm will be an audible signal generated continuously or in pulses. In other embodiments, sounder circuitry 30 may generate a verbal message (or a combination of an audible signal and a verbal message) to occupants in response to a command from MCU 28.

During the course of normal operation of life safety device 10, MCU 28 will periodically perform a battery test using battery test electronics 32. At the appropriate time, MCU 28 provides a battery test pulse BAT_TEST to battery test electronics 32, which causes battery test electronics 32 to turn on and draw current from the Vbatt output of battery assembly 14. Battery test electronics 32 provides test output BAT_VOLT to MCU 28 that represents the measured battery voltage while the discharge is taking place. During this normal battery test operation, the battery test pulse BAT_TEST is very short (typically 100 microseconds). The duration of the battery test pulse is selected to be just long enough to make sure that a steady state condition is reached. The battery voltage is measured, and the test is then terminated so that battery 16 is allowed to recover from the discharge.

Figure 2:
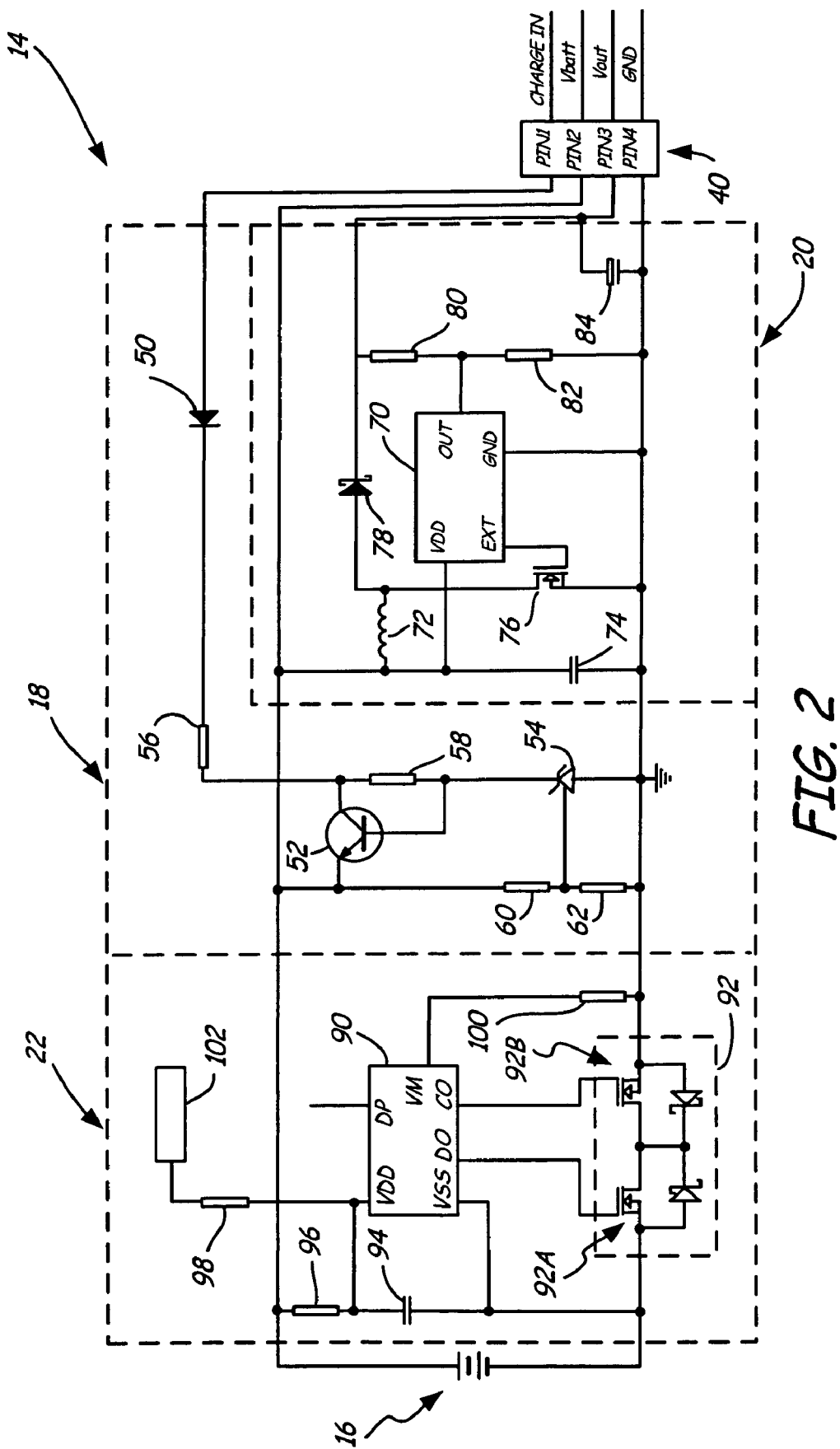
FIG. 2 is an electrical schematic diagram of the battery assembly of the life safety device of FIG. 1.

FIG. 2 is an electrical schematic diagram of battery assembly 14, which includes battery 16, battery charging circuit 18, booster circuit 20, battery protection circuit 22, and electrical connector 40. As shown in FIG. 2, connector 40 is a four pin connector, with PIN1 corresponding to CHARGE IN, PIN2 corresponding to Vbatt, PIN3 corresponding to Vout, and PIN4 corresponding to ground.

In the embodiment illustrated in FIG. 2, battery 16 is a lithium ion battery. In order to avoid reducing the service life of battery 16, battery voltage Vbatt must be maintained within set upper and lower limits. During normal operation, the maximum voltage is about 4.2 volts, and a minimum voltage is about 2.2 volts.

Charging circuit 18 includes diode 50, transistor 52, programmable shunt regulator 54, and resistors 56, 58, 60, and 62. In one embodiment programmable shunt regulator 54 is a TL431 adjustable precision shunt regulator.

Charging circuit 18 is active when voltage appears between PIN1 (CHARGE IN) and PIN4 (ground). The voltage will be present when AC power is connected to low voltage supply 12, shown in FIG. 1. The voltage supplied by low voltage supply 12 is greater than the voltage at the positive terminal of battery 16 (Vbatt). Charge current flows into charging circuit 18 through diode 50 and resistor 56 to the collector of transistor 52. The emitter of transistor 52 is connected to the positive terminal of battery 16 (and to PIN2). The flow of charging current through transistor 52 is controlled by resistors 58, 60, and 62 and programmable shunt regulator 54. Resistor 58 connects the collector of transistor 52 to the base of transistor 52 and the cathode of programmable shunt regulator 54. Resistors 60 and 62, which are connected between the emitter of transistor 52 and ground, form a voltage divider, which provides a reference voltage to shunt regulator 54. Shunt regulator 54 establishes a voltage at the base of transistor 52, which controls the maximum voltage to which battery 16 can be charged. If the voltage at the emitter of transistor 52 rises too high, transistor 52 will turn off, and no further charging current can flow from PIN1 (CHARGE IN) to battery 16.

Booster circuit 20 includes VFM step up DC/DC converter controller 70, inductor 72, capacitor 74, FET 76, diode 78, resistors 80 and 82, and capacitor 84. In one embodiment, DC/DC converter controller 70 is an RN5RY202 CMOS based VFM control integrated circuit which includes a voltage reference unit, an error amplifier, an oscillator, a VFM control circuit, and feedback resistors. In that embodiment, FET 76 is a CES2312 N-channel enhancement mode field effect transistor.

The voltage required to operate the circuitry of life safety device 10 requires a voltage that is higher than the 4.2 volts maximum from battery 16. Booster circuit 20 is a DC/DC converter, which steps up battery voltage Vbatt to output voltage Vout.

When battery assembly 14 is in a normal an operating mode with dual FET 92 turned on so that battery 16 is connected to PIN2 (Vbatt) and PIN4 (ground), battery voltage Vbatt appears between the VDD and GND terminals of controller 70. An oscillating signal from the EXT terminal of controller 70 is provided to the gate of FET 76, which alternately turns FET 76 on and off. When FET 76 is turned on, current flows from the positive terminal of battery 16 through inductor 72 and through FET 76 to ground. As a result, energy is stored in the magnetic field within inductor 72. When FET 76 turns off, current flows through FET 76 is interrupted. The stored energy in inductor 72 is delivered through diode 78 to PIN3 (Vout). Resistors 80 and 82 form a voltage divider between PIN3 (Vout) and PIN4 (ground). The voltage divider is connected to the output voltage terminal of controller 70, which is fixed at a reference value (e.g. 2 volts) within controller 70. Capacitor C4 acts as a smoothing capacitor at the output of booster circuit 20.

Battery protection circuit 22 includes battery protection integrated circuit 90, dual FET 92, which includes FETS 92A and 92B, capacitor 94, resistors 96, 98, and 100, and metal contact 102. In one embodiment, battery protection IC 90 is an S-8261 series integrated circuit that includes over-charge detection, over-discharge detection, and over-current detection. Dual FET 92 is, for example, a CEG8205 dual N-channel enhancement mode field effect transistor.

Battery protection circuit 22 provides both over-current and over-discharge protection for battery 16. Battery protection IC 90 monitors voltage between its VDD and VSS pins to determine whether an over-discharge condition exists. It monitors voltage between its VM and VSS terminals to determine whether an over-current condition exists.

Under normal conditions, the voltage difference between VDD and VSS is greater than an over-discharge detection voltage, and the voltage between VM and VSS is less than an over-current detection voltage. Under those conditions, battery protection IC 90 is in a normal operating mode in which it turns on both FETs 92A and 92B of dual FET circuit 92.

Resistor 96 and capacitor 94 provide protection for power fluctuation. In addition, resistor 96 provides electrostatic discharge (ESD) protection for battery protection IC 90. Under normal conditions, the voltage at pin VDD will be equal to battery voltage Vbatt at the positive terminal of battery 16. Resistor 98, which is connected between the VDD pin and contact 102, normally does not affect the voltage of pin VDD, because contact 102 is not connected to any other circuit component.

FET 92A acts as a charge control switch, while FET 92B acts as a discharge control switch. Both FETs 92A and 92B must be turned on in order to connect the negative terminal of battery 16 directly to ground (PIN4).

Resistor 100 is connected between ground and pin VM. It also provides protection for battery protection IC 90 against a condition in which the polarity of PIN1 and PIN4 is reversed.

When an over-current condition occurs, the voltage at pin VM is equal to or higher than the over-current detection voltage set by battery protection IC 90. This condition occurs when there is excess of discharge current flowing from battery 16 which continues longer than an over-current detection delay time of battery under the normal conditions. When an over-current condition is detected, battery protection IC 90 turns off discharge control FET 92A. The over-current condition returns to a normal condition when the impedance between PIN2 and PIN4 becomes higher than an automatic recoverable load resistance, and battery protection IC 90 detects that the potential at the VM pin is lower than the over-current detection voltage.

An over-discharge condition occurs when the voltage at the VDD pin of battery protection IC 90 falls below the over-discharge detection voltage and the detection continues for an over-discharge delay time or longer. Under those conditions, battery protection IC 90 turns discharge control FET 92A off. This causes the VM pin voltage to be pulled up by an internal resistor within battery protection IC 90 to a voltage near VDD. The current consumption is reduced to a power down current consumption level.

The power down mode is released when charging power is present between pins PIN1 and PIN4 and the voltage difference between pins VM and VDD exceeds a predetermined voltage (e.g. 1.3 volts). Battery protection IC 90 then returns to normal operation mode.

The present invention takes advantage of the over-discharge detection feature of battery protection circuit 22 in order to extend the shelf life of battery 16 and life safety device 10. At the time of installation of battery assembly 14 into life safety device 10 at the factory, an electrically conductive probe (not shown) is connected to PIN4 (ground) of connector 40. The probe is then inserted through a small opening in life safety device 10 so that it makes contact with contact pad 102. When an electrical connection is made from PIN4 (ground) through the probe and contact 102 to resistor 98, the voltage at pin VDD of battery protection IC 90 is reduced, because resistors R96 and R98 form a voltage divider between the positive and negative terminals of battery 16. This temporary reduction in voltage at pin VDD will cause battery protection IC 90 to detect an over-discharge condition, and to switch into the power down mode. Once the power down mode has been initiated, battery assembly 14 will remain in that mode until life safety device 10 is connected to a source of AC power at the time of installation.

The over-discharge protection/power down mode dramatically reduces the amount of discharge of battery 16 between the time of installation of the battery assembly 14 in device 10 and the time of installation of life safety device 10 in a building. As a result, the shelf life of life safety device 10 and battery 16 is significantly improved.

Although the present invention has been described with reference to preferred embodiments, workers skilled in the art will recognize that changes may be made in form and detail without departing from the spirit and scope of the invention.

The invention claimed is:

1. A battery assembly for a life safety device, the battery assembly comprising:
 a battery;
 a booster circuit for producing an output voltage that is greater than battery voltage;
 a battery protection circuit for sensing battery voltage and disconnecting the battery from the booster circuit when in an over-discharge protection mode;
 a battery charging circuit for charging the battery, wherein charging of the battery by the battery charging circuit causes the battery protection circuit to exit the over-discharge protection mode; and
 a manually actuated circuit for causing the battery protection circuit to enter the over-discharge protection mode.

2. The battery assembly of claim 1, wherein the battery protection circuit includes a terminal for monitoring battery voltage, and wherein the manually actuated circuit, when actuated, causes voltage at the terminal to be decreased to a level that initiates the over-discharge protection mode.

3. The battery assembly of claim 2, wherein the manually actuated circuit comprises a metal contact that is positioned to be electrically connected to a ground connection in the battery assembly.

4. The battery assembly of claim 3, wherein the manually actuated circuit includes a voltage divider connected between the battery and the metal contact.

5. The battery assembly of claim 4, wherein the voltage divider has a node connected to the terminal for monitoring battery voltage.

6. The battery assembly of claim 1, wherein the battery protection circuit is operable to switch from the over-discharge protective mode to a normal operating mode, in which the battery delivers power to the life safety device, in response to charging of the battery by the battery charging circuit.

7. The battery assembly of claim 1, wherein the battery protection circuit includes:
 a semiconductor switch connected between a negative terminal of the battery and a ground terminal; and
 a battery protection integrated circuit for controlling a state of the semiconductor switch so that the semiconductor switch is turned on during a normal operating mode and is turned off during the over-discharge protection mode.

8. The battery assembly of claim 7, wherein the battery protection integrated circuit includes a first terminal for monitoring battery voltage, and wherein the battery protection integrated circuit enters the over-discharge protection mode when voltage at the first terminal is less than an over-discharge detection voltage for an over-discharge detection delay time or longer.

9. The battery assembly of claim 8, wherein the battery protection circuit includes a first resistor connected between a positive terminal of the battery and the first terminal of the battery protection integrated circuit.

10. The battery assembly of claim 9, wherein the manually actuated circuit includes a second resistor connected to the first terminal, and wherein the manually actuated circuit is actuated by electrically connecting the second resistor to the ground terminal.

11. The battery assembly of claim 10 and further comprising:
 a multipin connector including a CHARGE IN terminal, a battery voltage terminal, an output voltage terminal, and the ground terminal.

12. The battery assembly of claim 11, wherein the positive terminal of the battery is connected to the battery voltage terminal; the battery protection circuit is connected to the battery voltage terminal and the ground terminal; the charging circuit is connected to the CHARGE IN terminal, the battery voltage terminal and the ground terminal; and the booster circuit is connected to the battery voltage terminal, the output voltage terminal, and the ground terminal.

13. A method of extending shelf life of a battery of a life safety device, the method comprising:
 manually initiating an over-discharge protection mode of a battery protection circuit associated with the battery to prevent current flow from the battery; and
 returning the battery protection circuit to a normal operating mode by connecting the life safety device to a charging power source.

14. The method of claim 13, wherein the battery and the battery protection circuit are part of a battery assembly that is connected to the life safety device by a multipin connector.

15. The method of claim 14, wherein the multipin connector includes a CHARGE IN terminal, a battery voltage terminal, and a ground terminal.

16. The method of claim 15, wherein manually initiating an over-discharge protection mode comprises temporarily applying a voltage to the battery protection circuit that is less than an over-discharge detection voltage for an over-discharge detection delay time or longer.

17. The method of claim 16, wherein temporarily applying a voltage comprises temporarily connecting a resistor to the ground terminal.

18. The method of claim 16, wherein the battery protection circuit includes a semiconductor switch between a negative terminal of the battery and the ground terminal.

19. The method of claim 18, wherein the battery protection circuit turns the semiconductor switch on during the normal operating mode and turns the semiconductor switch off during the over-discharge protection mode.

20. The method of claim 15, wherein the battery protection circuit returns to the normal operating mode in response to electrical power being present at the CHARGE IN terminal.

* * * * *